United States Patent [19]

Calandro et al.

[11] Patent Number: 4,755,390

[45] Date of Patent: Jul. 5, 1988

[54] PROCESS FOR THE PRODUCTION OF A FLAVORED CEREAL PRODUCT

[75] Inventors: Thomas P. Calandro, Paterson; W. Richard DeLauder, Randolph; Marsha K. Verrico, Fair Lawn, all of N.J.

[73] Assignee: Nabisco Brands, Inc., Parsippany, N.J.

[21] Appl. No.: 736,332

[22] Filed: May 21, 1985

[51] Int. Cl.$^4$ ............................................. A23P 1/08
[52] U.S. Cl. ..................................... 426/293; 426/620
[58] Field of Search ............ 426/93, 96, 103, 619–621, 426/292, 293

[56] References Cited

U.S. PATENT DOCUMENTS

| | | |
|---|---|---|
| 2,020,257 | 7/1933 | Dickinson . |
| 2,196,395 | 4/1940 | Kellogg . |
| 2,333,442 | 11/1943 | Rex . |
| 2,607,691 | 8/1952 | Bettman ............................ 426/293 |
| 2,946,689 | 7/1960 | Pikal . |
| 3,094,947 | 6/1963 | Green ................................ 426/293 |
| 3,395,022 | 7/1968 | Vollink et al. . |
| 3,557,718 | 1/1971 | Chivers . |
| 3,561,981 | 2/1971 | Roe et al. . |
| 3,615,676 | 10/1971 | McKown ............................ 426/293 |
| 3,840,685 | 10/1974 | Lyall et al. ......................... 426/93 |
| 4,089,984 | 5/1978 | Gilbertson . |
| 4,199,603 | 4/1980 | Sortwell, III . |
| 4,289,790 | 9/1981 | Bruelle . |
| 4,338,339 | 7/1982 | Edwards ............................ 426/96 |

FOREIGN PATENT DOCUMENTS

| | | |
|---|---|---|
| 898885 | 8/1984 | Belgium . |
| 1327350 | 8/1973 | United Kingdom . |
| 1437501 | 5/1976 | United Kingdom . |

Primary Examiner—Donald E. Czaja
Assistant Examiner—Carolyn Paden
Attorney, Agent, or Firm—Richard Kornutik

[57] ABSTRACT

A flavor-coated cereal capable of releasing its flavor coating into milk in which it is immersed is produced by wetting the surface of a cereal product with a sugar solution, sprinkling a particulate flavoring composition (for example, ground hard candy) onto the cereal product while it is still wet with the sugar solution, and then drying the cereal product.

14 Claims, 1 Drawing Sheet

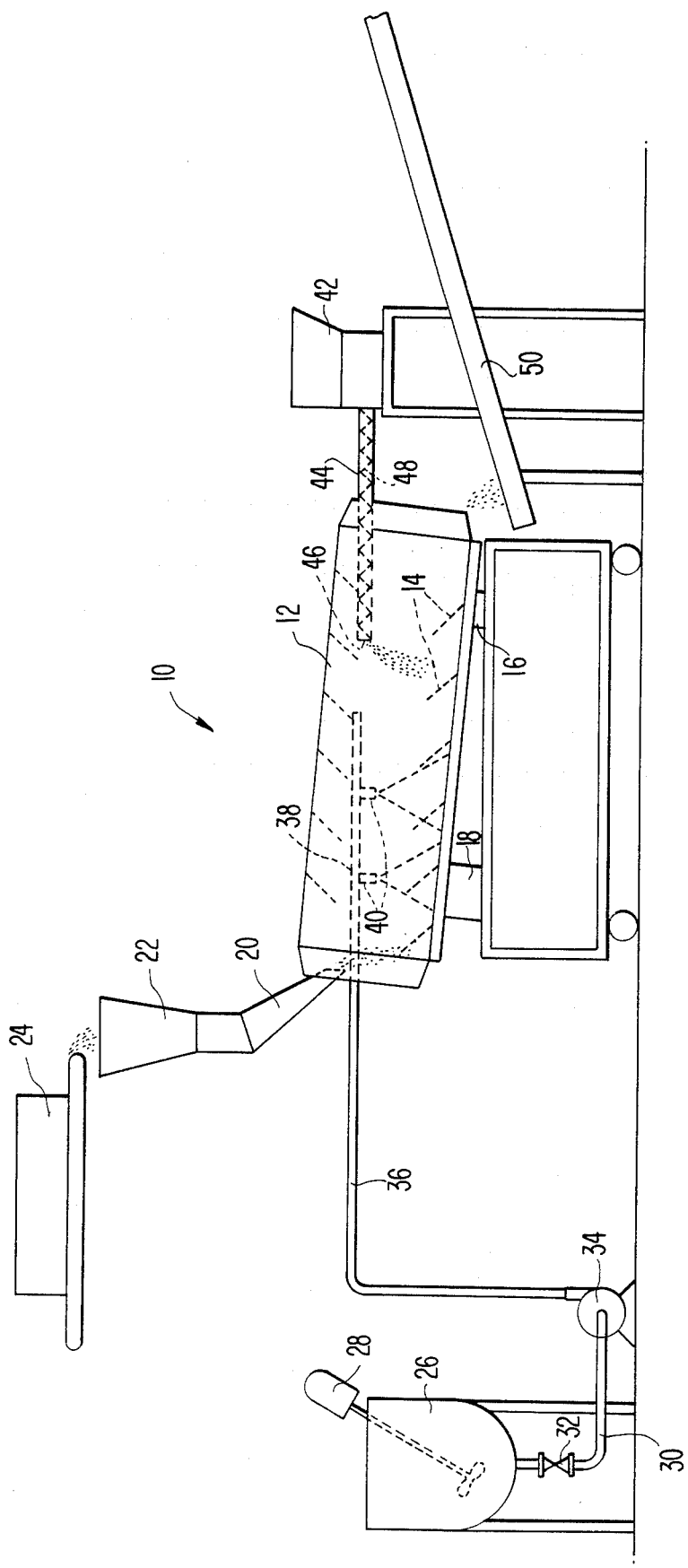

PROCESS FOR THE PRODUCTION OF A FLAVORED CEREAL PRODUCT

BACKGROUND OF THE INVENTION

I. Field of The Invention

This invention relates to a flavored cereal product and to a process and apparatus for the production thereof. More specifically, this invention relates to a flavored cereal product comprising an cereal product to the surface of which is adhered a particulate flavoring composition.

II. Description of The Prior Art

One major market for cereal products is of course breakfast cereals. Such breakfast cereals may be in the form of flakes or in shredded form. Alternatively the cereals may be made by gun-puffing the cereal or by extruding a cereal product at relatively high temperatures with a sudden release of pressure, so that the cereal product "puffs" to give a product of low density. Such cereal products can be made with a crunchy texture which makes them highly attractive for use as breakfast cereals. However, unless some additional flavorant is incorporated into the cereal product, its taste tends to be rather bland. Accordingly, in order to enhance the consumer appeal of the product, especially to children, manufacturers desire to add flavorants to cereal products. In theory, one might incorporate a flavorant into an extruded cereal product simply by mixing the flavorant with the dough from which the cereal product is prepared so that the flavorant becomes incorporated prior to extrusion of the cereal product. However, in practice such incorporation of the flavorant prior to the extrusion is likely to be beset with serious problems because the temperatures and pressure changes involved in the extrusion process may cause chemical changes in the flavorant. Moreover, incorporating the flavorant into the dough would result in uniform distribution of the flavorant throughout the cereal product, which effectively results in wasting most of the flavorant, since the flavorant in the interior of the cereal product will not be released, or hence tasted, during consumption of the product. Accordingly, in flavoring an extruded cereal product it is desirable to concentrate most of the flavorant on the surface, where it can exert its maximum sensory effect. With the other forms of cereal product mentioned above, it is in practice again most convenient to flavor the cereal product after the product reaches its final physical form.

The prior art describes numerous methods for combining one food with a flavoring material, and for coating food products with flavoring or other materials. For example, U.S. Pat. No. 2,020,257 to Dickins describes a fruit-flavored breakfast cereal comprising a cereal in flaked or shredded form and a partially-dried fruit in finely divided condition, the two being united by heating the fruit until the natural cementitious constituents of the fruit are rendered sticky, so that the fruit adheres to the cereal.

U.S. Pat. No. 2,946,689 issued July 26, 1960, to Pikal describes a caramel-coated apple produced by applying a surface coating of caramel confection to an unpeeled apple and then embedding a overcoated layer of a comminuted confection, for example, a nut meat, in the layer of caramel.

U.S. Pat. No. 4,199,603 issued Apr. 22, 1982 to Sortwell describes frozen food products, such as fish, poultry and vegetable products, suitable for micro-wave or oven cooking, which are prepared by coating frozen portions of the food products with an edible oil containing a moisture-absorbant and then applying to the coated portions finely divided hygroscopic, crisp, particulate materials such as toasted cereal or carbohydrates, so that upon cooking of the food product the outer layer gives an appearance of a fat-fried product.

U.S. Pat. No. 4,089,984 issued May 16, 1978 to Gilbertson, describes a process for coating breakfast cereal in which the cereal is first coated with honey and/or corn syrup and then a finely divided edible material, which can be protein, wheat germ, dextrose or caseinate, is sprinkled on the sticky, syrup-coated cereal. The solid, finely-divided coating material serves to keep the pieces of cereal separate from one another, since the honey and corn syrup used are practically impossible to dry on the surface of the cereal.

U.S. Pat. No. 4,289,790 issued Sept. 15, 1981 to Bruelle, describes a storage-stable confection produced by coating a core of cereal, dried fruit or nuts with alternative layers of chocolate and gasified candy. To protect the core from the fats in the chocolate, the core may be caramelized by coating it with a sugar before applying the chocolate and gasified candy. The product is stated to provide all the desired qualities of crunchiness, sizzle and chocolate flavor.

U.S. Pat. No. 2,196,395 issued Apr. 9, 1914, to Kellogg, describes a process for candy-coating cereal in which the cereal is mixed with a hot sugar solution containing a fat or oil; the sugar solution can be in the form of molasses, glucose or cane sugar. The process is designed to permit the sugar-coating of relatively fragile cereal products, such as flakes, which may be damaged by other coating techniques, and is also stated to give the product good storage stability.

U.S. Pat. No. 2,333,442 issued Nov. 2, 1943 to Rex, describes the coating of a puffed cereal product with a honey-flavored candy coating. The coating is produced by contacting the cereal product with a hot solution containing sugar, honey flavoring and hardening agents. Following coating, the coated cereal is cooled very rapidly to produce separation of the individual grains of sugar. It is stated that the process produces a hard coating which maintains its integrity and texture for indefinitely long periods of time without disintegration or conversion into a different form of sugar.

U.S. Pat. No. 3,395,022 issued July 30, 1968 to Vollink et al, describes a breakfast cereal containing freeze-dried fruit which is not attached to the cereal, the two simply being mixed, so that the fruit can be rehydrated when the fruit is immersed in milk.

U.S. Pat. No. 3,561,981 issued Feb. 9, 1971 to Roe et al, describes a method of coating a breakfast cereal in which the cereal is first coated with a binder, preferably sugar syrup, and while the binder is still tacky a dry flavoring composition in the form of a dry or powdered ice cream mix is sprinkled onto the surface of the cereal.

U.S. Pat. No. 3,557,718 issued Jan. 26, 1971 to Chivers, describes a process for coating breakfast cereal or popcorn in which the substrate is first coated with a sugar slurry made by mixing ground particles of candy floss with a limited amount of water. The wet, slurry-coated cereal or popcorn may then have ground candy floss and/or ground nut meat sprinkled on its surface. Finally, the coated cereal is heated so as to fuse the candy floss into a continuous glaze surrounding the particles of cereal or popcorn. This process is stated to endow the cereal with the color and flavor of the candy floss, and also to permit coating of difficult, fragile materials, such as cereal flakes, which cannot conveniently be coated by other processes using heavy sugar syrups.

Belgian Pat. No. 898885, published Aug. 10, 1984, and claiming priority of U.S. patent application Ser. No. 522,428 filed Aug. 11, 1983, describes a process for the preparation of a filled composite food product; in this process a mixture of large dry solid pieces having clear external surfaces and small pieces are placed in a receptacle, a non-sticky, low viscosity liquid is charged into the receptacle, and the resultant bed of large and small pieces is agitated so that the small pieces slide over the surfaces of the large pieces and become concentrated in the hollows or cavities of the large pieces. The resulting composite pieces are then dried so that the small pieces become bound in the hollows or cavities of the large pieces. This method has the disadvantage that, because it depends upon the small pieces sliding into the hollows or cavities of the large pieces, it is not suitable for coating large pieces in forms which lack such hollows or cavities.

There is one important distinction between breakfast cereals and most other foods as regards the environment in which the food is placed immediately prior to consumption which affects the choice of method for flavoring the cereal, namely that breakfast cereals are normally immersed in milk before consumption, whereas other foods, for example, the caramel-coated apples, disclosed in Pikal, are normally eaten dry. Although the point does not seem to have been appreciated in the prior art, this immersion of the breakfast cereal in milk offers the possibility of greatly enhancing the effectiveness of a flavorant incorporated in a breakfast cereal. If the flavorant could be applied to the surface of the cereal in such a way that, upon immersion of the cereal into milk, at least part of the flavorant would dissolve in the milk, this release of flavorant into the milk would lead to a greatly enhanced flavor sensation by the consumer of the cereal, as compared with a flavorant which remained on the surface of the cereal despite immersion in the milk. Furthermore, if the flavorant could be applied to the cereal in such a way that it would dissolve in the milk, flavorants could be used which would otherwise be unacceptable because their presence on the surface of the milk-saturated cereal would produce a texture unacceptable to the consumer. Accordingly, this invention provides a flavor-coated cereal product in which a flavorant is present on the surface of a cereal product in such a form that it will at least partially dissolve upon immersion of the cereal product in milk. The present invention also provides a process and apparatus for the production of such a flavor-coated cereal product.

SUMMARY OF THE INVENTION

This invention provides a process for flavoring a cereal product in which a sugar solution is placed on the surface of the cereal product. Then, while the cereal product is still wet with the sugar solution, the cereal product is brought into contact with a particulate flavoring composition soluble in milk and comprising a flavorant dispersed in a sugar matrix, thereby causing particles of the flavoring composition to adhere to the wet surface of the cereal product. Finally, the cereal product is dried without substantial melting of the flavoring composition particles so that the particles of the flavoring composition become attached, by means of the dried sugar solution, to the surface of the cereal product but do not become fused to one another. Thus, upon immersion of the cereal product in milk the particles of the flavoring composition will at least partially dissolve in, and release flavor into, the milk.

This invention also provides a flavored-coated cereal product comprising a particle of cereal product, a layer of sugar crystals covering and adhering to at least part of the surface of the particle, and discrete particles of a flavoring composition embedded in the layer of sugar crystals and thereby held on the surface of the cereal product. The flavoring composition used is soluble in milk, comprises a flavorant dispersed in a sugar matrix, and preferably has an average particle size of from about 0.01 to about 0.15 inch (0.25 to 3.8 mm.), or about 10 to about 50 U.S. mesh.

Finally, this invention provides an apparatus for coating a cereal product with a particulate flavoring composition. This apparatus comprises a drum having an inlet end with an inlet for the cereal product and an opposed, outlet end provided with an outlet for flavor-coated cereal product, this drum being rotatable. At least one spray head is disposed adjacent the inlet end of the drum and arranged to spray liquid on to cereal product within the drum. The apparatus also comprises a device for supplying particulate flavoring composition to the drum, this device comprising a hopper and a screw conveyor connected at its one end to the hopper and at its opposed end to an outlet arranged to feed the particulate flavoring composition into the drum. The outlet of the device is disposed within the drum between the spray head and the outlet end of the drum. The drum is disposed so that, when it is rotated, cereal product entering its inlet will pass the spray head and then the outlet through which the particulate flavoring composition is applied to the drum and finally will leave the drum via the outlet thereof.

BRIEF DESCRIPTION OF THE DRAWING

The accompanying drawing is a schematic side elevation of an apparatus of the invention.

DETAILED DESCRIPTION OF THE INVENTION

From the foregoing Summary of the Invention, it will be seen that the process of the invention uses a sugar solution as an "adhesive" to stick particles of a flavoring composition on to the surface of a cereal product. The surface of the cereal product is first coated with the sugar solution and then, while still wet, is contacted with the particulate flavoring composition, which adheres to the wet surface of the cereal product because of the inherently sticky nature of the sugar solution. Finally, the coated cereal product is dried without melting the particles of flavoring composition, thereby causing the sugar solution to evaporate and form a layer of sugar crystals on the surface of the cereal product so that the discrete particles of the flavoring composition are embedded in this layer of sugar crystals, (and visible on the surface of the cereal product) and hence attached to the underlying cereal product, but upon immersion of the cereal product in milk the particles of flavoring composition are free to at least partially dissolve in the milk, thus releasing their flavorant into the milk and enhancing the consumer's flavor perception. Thus, coating of the cereal with the flavorant composition by the process of the invention enhances the flavor perception which can be achieved using a given quantity of flavoring composition. Alternatively, the process of the invention may enable one to reduce the amount of flavoring composition needed to achieve a desired degree of flavoring. Since the flavoring composition will normally be one of the more expensive components of the flavored cereal product, at least on a cost per unit weight basis, the process of the invention thus offers the possibility of significant cost reduction in the flavored cereal product.

If desired, the sugar solution used in the process of the invention may itself contain a flavorant; the inclusion of such a flavorant in the sugar solution, and hence in the layer of sugar crystals in the final product, serves as a "flavor booster" to enhance the flavor of the final product. The flavorant provided in the sugar solution may be the same as, or different from, the flavorant in the flavoring composition. Thus multi-flavor cereals may easily be prepared by using different flavors in the sugar solution and the flavoring composition.

Cereal products suitable for coating by the process of the invention are well known to those skilled in the art and hence it is unnecessary to describe in detail the production of such cereal products. The choice of an appropriate flour and other components of the dough used to form the cereal products is of course governed largely by the taste and texture desired in the final coated cereal product. It has been found that doughs based on corn flour, oat flour, rice flour and wheat flour give good results in the process of the invention. However, especially when the flavorant in the flavoring composition is to be a fruit flavor, the use of a dough based on whole wheat is not recommended, since it has been found that while wheat flavor in the cereal product does not give a good taste contrast with the fruit flavor in the flavoring composition, nor does it give a product with a very desirable appearance.

The exact geometric form of the cereal product subjected to the process of the invention is not critical and any of the forms of ceral product which will be familiar to those skilled in the art may be used. For example, the cereal product may be in flake form, shredded form, gun-puffed form or extruded form. When an extruded form is used, the extruded cereal product may be in the form of spherical pieces, such as those used in certain commercially-available breakfast cereals. However, it has been found that the form of extruded cereal product which best promotes adhesion of the particulate flavoring composition to the cereal product is cereal product in the form of toroidal pieces. Such toroidal pieces are commercially available and methods for the production thereof will be familiar to those skilled in the art.

The consumer appeal of the flavor-coated cereal product of the invention may be enhanced by introducing into the cereal product, prior to its coating, an edible food dye having a color associated with the flavor of the flavoring composition with which the cereal product is to be coated. For example, if a lemon-flavored coating is to be applied, a yellow dye can be introduced into the cereal product before coating. Methods for the introduction of edible food dyes in either liquid or solid form into cereal products are well known to those skilled in the art and hence will not be described here.

The success of the coating process of the invention is affected by the moisture content of the cereal product used. It has been found that, in general, it is desirable that the moisture content of the cereal product, prior to contact with the sugar solution, be in the range of 1 to 10% by weight.

In order to ensure a uniform coating of the cereal product with the sugar solution, it is preferred that the sugar solution be applied to the cereal product by spraying. Most uniform application of the sugar solution is promoted by agitating a mass of particles of cereal product while spraying sugar solution onto the mass from above. Those skilled in the art of food technology will be familiar with rotatable drums provided with internal baffles which can be used to tumble or agitate and transfer a mass of particles of cereal product in a way that allows a coating to be very uniformly applied, and such drums are suitable for use in the application of the sugar solution in the process of the instant process.

Normally, it will be most convenient to coat the whole surface of the particles of cereal with the sugar solution. However, we do not absolutely exclude the possibility that the sugar solution might be applied only to part of the surface of the cereal particles, for example by dipping large particles into a shallow bath of the sugar solution.

The preferred concentration of sugar solution for use in the process of the invention is from 60 to 85% by weight. If the sugar solution is too dilute, it may be insufficiently sticky to promote adhesion of the flavoring composition to the cereal product and renders the drying of the product difficult and inefficient because of the large quantity of water which must be removed to deposit a given quantity of sugar. On the other hand, while if the sugar solution is too concentrated, it may become viscous, difficult to spray and difficult to apply uniformly in a thin layer to the cereal product.

It is desirable, though not absolutely essential, to incorporate an emulsified oil into the sugar solution. The presence of such oil produces better flow of the solution through any nozzle or spray heads used to spray the solution onto the cereal product. In addition, the presence of the emulsified oil promotes foaming of the sugar solution in contact with the cereal product. A foamy layer of sugar solution is desirable in order to assist in adhering the flavoring composition to the cereal product and to give a frosted appearance to the product. We have found that best results are obtained by incorporating from about 0.5 to about 5% by wt. of oil into the sugar solution. Obviously, the oil used must be edible and should also be relatively easy to emulsify in the sugar solution; it is preferred that vegetable oil such as sun flower oil or coconut oil be used. Preferably, the weight of sugar solution applied to the cereal product is from about 15 to 65% by wt. of the cereal product.

After the sugar solution has been applied to the cereal product, but while the cereal product is still wet with the sugar solution, the cereal product is contacted with a particulate flavoring composition comprising a flavorant dispersed in a sugar matrix, thereby causing particles of the flavoring composition to adhere to the wet surface of the cereal product. A suitable flavorant composition can be prepared by grinding a hard candy product into small particles. Any type of hard candy, for example, flavored hard rock candy, may be used.

The particle size of the particulate flavoring composition is of great importance in this invention. If the particle size is too small, the particles tend to melt in the subsequent drying step so that a continuous or semi-continuous layer of melted and resolidified flavorant composition occurs in the final flavor-coated cereal product. Such a continuous or semi-continuous layer is undesirable, since it hinders dissolution of the particles in milk. If, on the other hand, the particle size is too large the particles will not sufficiently dissolve when the final product is immersed in milk prior to consumption. It is of course one of the advantages of the present invention that it permits the flavoring of cereal products with hard candy, a type of material which is otherwise difficult to incorporate into a cereal product.

The optimum particle size for any particular flavoring composition can easily be determined by routine empirical tests, and naturally this optimum particle size may vary somewhat depending upon the specific flavoring composition employed. However, in general it is preferred that the average particle size of the flavoring composition be in the range of 10 to 50 U.S. mesh. Moreover, desirably the sizes of the particles of flavoring composition are such that, upon immersion of the flavor-coated extruded cereal product in milk at 10° C. (50° F.), at least 50% of the flavoring composition will dissolve in the milk within three minutes.

After the cereal product has been coated with the flavoring composition, the product must be dried to evaporate water from the sugar solution, thus producing on the surface of the cereal product a layer of sugar crystals which bond the flavoring composition to the cereal product. Preferably, the drying is continued until the moisture content of the flavor-coated cereal product is from 1 to 6% by wt. Not only does such a degree of drying ensure firm adhesion of the flavoring composition, but it also produces a product with the requisite degree of storage stability and crispiness for human consumption. Since melting of the particles of flavoring composition during drying is to be avoided, it is necessary to avoid exposing the product to very high temperatures during the drying step, and hence it is preferred that hot air drying be used. During such hot air drying, the temperature of the product desirably should not exceed about 130° C., and drying is preferably effected in the temperature range of 95°-130° C., which is high enough to promote rapid drying without melting the flavoring composition.

Although the proportions of cereal product, sugar solution and particulate flavoring composition used in the preparation of the instant flavor-coated cereal product may of course vary with the exact nature of the various ingredients used, in general it is preferred that, of the final flavor-coated cereal product, the cereal comprise from about 35 to about 85% by wt., the sugar crystals comprise from about 15 to about 65% by wt. and the flavoring composition comprise from about 0.5 to about 4% by wt.

A cereal product of the invention having enhanced consumer appeal may be prepared by including a variety of flavors and colors therein. If a solid or liquid food dye is used to color the cereal product, to produce a mixture of different colors it will normally be necessary to color separate batches of the cereal product with the individual colors and then to mix these batches before or after coating with the flavoring composition.

To produce the mixture of flavors, separate batches of cereal product may of course be flavored separately. However, as noted above, the preferred method of introducing a plurality of flavors in the process of the present invention is to incorporate one or more flavors in the flavoring composition and one or more additional flavors in the sugar solution. For instance, as shown in the Example below an interesting product may be obtained by preparing approximately equal quantities of orange-colored, yellow-colored and red-colored cereal products, wetting them with a sugar solution containing orange and lemon flavors and coating them with with a cherry-flavored composition.

The accompanying drawing shows a schematic side elevation of an apparatus used to prepare the flavor-coated cereal product. This apparatus, generally designated 10, comprises a drum 12 which can be rotated about its own axis by a drive mechanism (not shown). The drum 12 is provided with internal baffles 14 fixed to its inner cylindrical surface and is mounted on supports, schematically indicated as 16 and 18, which are of different heights so that the axis of the drum 12 is inclined at an angle of about 5° to the horizontal.

Both ends of the drum 12 are left open. The left-hand end (in the drawing) of the drum 12 is the inlet end thereof, and is provided with a cereal inlet conduit 20 through which cereal product flows into the drum 12 from a hopper 22. The hopper 22 is itself fed by a cereal feeder 24 which may be, for example, one or more apparatus for producing or treating cereal product. Thus, the apparatus of the invention can easily be combined with, for example, an extrusion or gun-puffing apparatus, thereby enabling the extrusion or puffing and coating of the cereal product to be performed as a continuous process. As noted above, desirably the cereal product is dried to a moisture content of 1-10% by wt. before being subjected to the coating process and hence if necessary a dryer (not shown) may be connected between the cereal inlet conduit 20 and the associated hopper 22 in order to reduce the moisture content of the cereal entering the conduit 20 to its optimum value.

The inlet end of the drum 12 is provided with means for applying sugar solution to the cereal entering the drum 12 from the conduit 20, this means for applying sugar solution comprising a syrup tank 26 equipped with a stirrer 28, a pipe 30 extending from the tank 26 via a valve 32 to the inlet of a pump 34, a pipe 36 extending from the outlet of the pump 34 to a spray manifold 38 extending parallel to the axis of the drum 12 but disposed within the upper part thereof. The manifold 38 is also provided with a plurality of nozzles or spray heads 40 spaced among the length of the manifold 38 and arranged to direct sugar solution emerging therefrom downwardly on to cereal product lying in the lower part of the drum 12. For the sake of simplicity, only two spray heads 40 are shown in the drawing, though in practice a larger number will normally be employed.

The lower, right-hand (in the drawing) end of the drum 12 comprises the outlet end thereof through which the final, flavor-coated cereal product is discharged to a dryer. This outlet end of the drum 12 has a hopper 42 adjacent thereto, this hopper 42 serving to hold the particulate flavoring composition. A flavoring composition conduit 44 extends from the base of the hopper 42 to an outlet 46 positioned within the upper part of the drum 12 adjacent the outlet end thereof. It should be noted that manifold 38 which supplies the sugar solution terminates at a position such that there is a short gap between the end of the manifold 38 and the outlet 46 of the conduit 44. Within the conduit 44 is mounted an Archimedean screw conveyor 48 rotated by an electric motor (not shown). The screw conveyor 48 of course serves to convey the particulate flavoring composition from the base of the hopper 42 to the outlet 46, whence it is sprinkled on the cereal product resting in the base of the drum 12.

The apparatus shown in the drawing operates as follows. Cereal product issuing from the cereal conduit 20 falls into the base of the drum 12 where it is sprayed with sugar solution issuing from the manifold 38 via the nozzles 40. The drum 12 is continuously rotated in use and this rotation, together with the baffles 14 provided on the interior of the drum, ensure that the cereal product is constantly tumbled so that it becomes uniformly coated with the sugar solution. The sloped axis of the drum 12 ensures that, as the cereal product is tumbled within the drum, it gradually slides from the inlet to the outlet end of the drum. The coating of the cereal product with sugar solution continues until the cereal product passes the end of the manifold 38. Shortly thereafter, the cereal product passes beneath the outlet 46 from which issues the particulate flavoring composition. At this stage, the cereal product is still wet with the sugar solution and hence the particulate flavoring composition issuing from the outlet 46 sticks to the wet surface of the cereal product. Moreover, the continuous rotation of the drum 12 and the action of the internal baffles therein continues the tumbling of the cereal product, so that the whole surface thereof becomes coated with the particulate flavoring composition. Finally, the flavor-coated cereal product leaves the outlet end of the drum 12, whence it is conveyed by a conveyor 50 to a forced hot-air dryer (not shown), for drying to a moisture content of 1 to 6% by wt.

The following Example is now given, though by way of illustration only, to show details of particularly preferred ingredients, proportions and techniques used in the instant invention.

EXAMPLE

A flavor-coated extruded cereal product was produced using an apparatus as shown in the accompanying drawing having a diameter of 6 feet (1.83 m.) and an axial length of 8 feet 6 inches (2.59 m.). During the production of the flavor-coated extruded cereal product, the drum was rotated about its own axis by means of an electric motor at 25 rpm.

An extruded cereal product in the form of toroidal pieces approximately 2 cm. in diameter was converted into a mixture of orange, yellow and red pieces using vegetable and natural dyes in liquid form. The coloring was affected by spraying batches of the cereal product with one of the dyes, and thereafter mixing the differently-colored batches to produce the desired mixture of colors. The dyed cereal product was fed at a rate of 300 lb. (136 kg.) per hour through the cereal inlet conduit 20 into the drum. A sugar solution having a concentration of 80% by wt., containing approximately 2% by wt. of coconut oil, and containing orange and lemon flavors, was pumped at a rate of 2 lbs. (907 g.) per minute through the manifold 38 and sprayed from four spray heads 40 provided on this manifold on to the tumbling mass of extruded cereal product resting in the base of the drum 12.

A cherry-flavored hard candy was ground in a ball mill to an average particle size of 0.05 inch (1.3 mm.) and placed in the hopper 22. The ground candy was then fed at a rate of 1.5 lbs. (680 g.) per hour by means of the screw conveyor 48 along the conduit 44 and sprinkled from the outlet 46 of the conduit on to the tumbling extruded cereal product in the lower part of the drum 12, while the extruded cereal product was still wet with the sugar solution. The flavor-coated extruded cereal product was removed from the outward end of the drum and passed to a conventional hot air dryer operated with an air inlet temperature of 115° C. and an exhaust temperature of 90° C., thereby producing a flavored extruded cereal product having a moisture content of approximately 2% by wt. This cereal product was a visually-appealing breakfast cereal which, upon immersion in milk, produced within a few seconds a pronounced mixture of orange, lemon and cherry flavors in the milk. After a few seconds immersion in the milk, the mouth feel of the flavor-coated cereal product was equivalent to that of an uncoated product.

It will be apparent to those skilled in the art that numerous changes and modifications can be made in the preferred embodiments of the invention described above without departing from the scope of the invention. Accordingly, the whole of the foregoing description is to be construed in an illustrative and not in a limitative sense, the scope of the invention being defined solely by the appended claims.

We claim:

1. A process for flavoring a cereal product, which process comprises:

applying a sugar solution having a sugar concentration of from about 60 to about 85 percent by weight to the surface of the cereal product;

while the cereal product is still wet with the sugar solution, contacting the cereal product with a particulate flavoring composition soluble in milk, the flavoring composition comprising a flavorant dispersed in a sugar matrix, the particle size of the flavoring composition being sufficiently large to prevent substantial melting during the subsequent drying step but sufficiently small to permit the particles of the flavoring composition to dissolve readily in milk, thereby causing particles of the flavoring composition to adhere to the wet surface of the cereal product; and thereafter drying the cereal product at a temperature not exceeding about 130° C. without substantial melting of the particles of the flavoring composition thereon for a time sufficient to cause the particles of the flavoring composition to become attached, by means of the dried sugar solution, to the surface of the cereal product without fusing the particles to one another, so that, upon immersion of the cereal product in milk, the particles of the flavoring composition will at least partially dissolve in, and release flavor into the milk.

2. A process according to claim 1 wherein, prior to contact with the sugar solution, the moisture content of the cereal product is adjusted to about 1 to about 10 percent by weight.

3. A process according to claim 1 wherein the cereal product is formed using a flour selected from the group consisting of corn flour, oat flour, rice flour and wheat flour.

4. A process according to claim 1 wherein the cereal product is in flaked form, shredded form, gun-puffed form or extruded form.

5. A process according to claim 4 wherein the cereal product is an extruded cereal product in the form of substantially toroidal pieces.

6. A process according to claim 4 wherein the cereal product is an extruded cereal product in the form of substantially spherical pieces.

7. A process according to claim 1 wherein the sugar solution contains oil dispersed therein.

8. A process according to claim 7 wherein the dispersed oil comprises from about 0.5 to about 5 percent by weight of the sugar solution.

9. A process according to claim 1 wherein the weight of sugar solution applied to the cereal product is from about 15 to about 65 percent by weight of the cereal product.

10. A process according to claim 1 wherein the sugar solution contains at least one flavorant.

11. A process according to claim 10 wherein the flavorant in the sugar solution has a flavor different from that in the flavoring composition.

12. A process according to claim 1 wherein the flavoring composition has an average particle size in the range of 10 to about 50 U.S. mesh.

13. A process according to claim 1 wherein the weight of said flavoring composition adhered to the surface of the cereal product is from about 0.25 to about 4 percent by weight of the cereal product.

14. A process for flavoring a cereal product, which process comprises:

adjusting the moisture content of the cereal product to about 1 to about 10 percent by weight;

thereafter applying a sugar solution to the surface of the cereal product a sugar solution having a sugar concentration of from about 60 to about 85 percent by weight and comprising from about 0.5 to about 5 percent by weight of oil dispersed therein;

while the cereal product is still wet with the sugar solution, contacting the cereal product with a particulate flavoring composition soluble in milk, this flavoring composition comprising a flavorant dispersed in a sugar matrix and having an average particle size of from 10 to 50 U.S. mesh, thereby causing particles of the flavoring composition to adhere to the wet surface of the cereal product; and thereafter drying the cereal product to a moisture content of from about 1 to about 6 percent by weight without melting the particles of flavoring composition thereon for a time sufficient to cause the particles of the flavoring composition to become attached to the surface of the cereal product without fusing the particles to one another, so that, upon immersion of the cereal product in milk, the particles of the flavoring composition will dissolve in, and release flavor into the milk.

* * * * *